F. KITTEN.

Straw-Carrier for Thrashing-Machines.

No. 8,652. Reissued April 1, 1879.

WITNESSES

John A. Ellis

John E. Donnelly

INVENTOR

Florens Kitten

By Henry J. Ennis

ATTORNEY

N. PETERS, PHOTO-LITHOGRAPHER, WASHINGTON, D. C.

UNITED STATES PATENT OFFICE.

FLORENS KITTEN, OF FERDINAND, INDIANA.

IMPROVEMENT IN STRAW-CARRIERS FOR THRASHING-MACHINES.

Specification forming part of Letters Patent No. 211,664, dated January 28, 1879; Reissue No. 8,652, dated April 1, 1879; application filed February 24, 1879.

*To all whom it may concern:*

Be it known that I, FLORENS KITTEN, of Ferdinand, in the county of Du Bois and State of Indiana, have invented certain new and useful Improvements in Straw-Carriers for Thrashing-Machines; and I do hereby declare the following to be a full, clear, and exact description of the same, reference being made to the accompanying drawings, forming a part of this specification, and in which—

Figure 1:
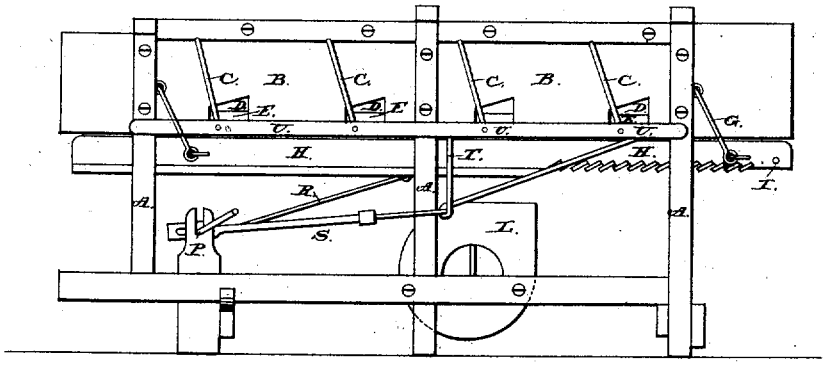
Figure 2:
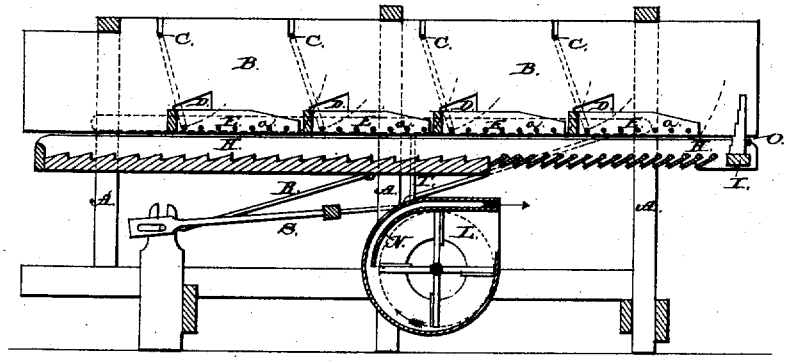
Figure 3:
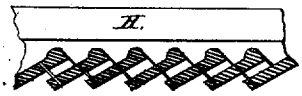

Figure 1 is a side elevation of my improved machine. Fig. 2 is a longitudinal vertical section of the same. Fig. 3 is a detail view.

This invention relates to new and useful improvements in straw-carriers for thrashing-machines; and the invention consists in a straw-conveyer composed of successive sections, each section vibrating from a pivotal line located substantially above its front or receiving end, thereby serving in the double capacity of straw-conveyer and shaker.

It further consists in the combination of a straw-conveyer composed of successive sections, each section vibrating from a pivotal line located substantially above its front or receiving end, and mechanism whereby the sections are simultaneously operated for conveying the straw from one section to another.

It further consists in the combination of a straw-conveyer composed of successive sections, each section vibrating from a pivotal line located substantially above its front or receiving end, a carrier suspended under said conveyer, and intermediate connecting mechanism, whereby said straw-conveyer and shaker are simultaneously moved in opposite directions.

It further consists in the combination, with the rear shaker of the series, of vibrating and pivoted shouldered fingers for ejecting the straw from the machine.

It finally consists in a novel construction of carrier, all as will be hereinafter fully described, and specifically pointed out in the claims.

In the drawings, A represents a suitable frame-work, upon the upper portion of which are secured the sides B, which form a way or guide, through which the straw passes. Passing through the top of these sides, and projecting down to their lower edges on the outer side, are the bent rocking shafts C, which have their lower ends passed through the holes D, in the lower edges of the sides, and rigidly secured to the shakers E in such a manner that when the lower ends of the shafts are made to vibrate or reciprocate, the shakers vibrate from a pivotal line located substantially above their front or receiving ends; and as all the shakers are simultaneously operated and receive the above-described movements, the straw is passed along from one to another until it is finally carried through and discharged out of the end of the machine. These shakers, which serve in the double capacity of straw-conveyers and shakers, by the novel movements they receive, consist of a wooden frame having but three sides, and having the wires *a* extending across them at right angles to the length of the frame A, so as to admit of the grain readily passing through them, while the straw is carried over them, as above described. By making the shakers act in the double capacity of shakers and straw-conveyers the operation of the machine is made more perfect, and the operating parts greatly cheapened and simplified.

Suspended by the rods G from the sides B is a box-shaped carrier, H, into which the grain falls from the straw while being agitated by the shakers E. The forward and greater portion of the surface of the bottom of this carrier is formed into transverse inclined recesses or grooves, the shoulders of which recesses or grooves catch behind the grains, and, by the vibrating or reciprocating movement imparted to said carrier, constantly force or carry them toward the rear end of the carrier, where there is formed a sort of sieve or lattice-work as wide as the carrier itself, and through which the grain falls upon riddles usually arranged below said carrier. Passing through these inclined slats forming the sieve or lattice-work are a number of nails or other stops, at any desired distance apart, as clearly shown in Fig. 3, which serve to prevent the straw being carried along through the sieve or lattice-work with the grain.

In the rear end of the carrier is pivoted a shaft, I, which is provided with prongs or fingers O, having a series of shoulders formed upon them, for the purpose of catching hold of the straw after it has left the last shaker of the series, and carrying or discharging it out of the machine. These fingers or prongs can be turned upward at any desired angle, and as they vibrate or reciprocate with the carrier, they serve not only to carry the straw out of the machine, but also prevent the straw from falling into an elevator-spout, usually attached to the machine.

As the grain falls through the sieve or lattice-work upon riddles usually arranged under the same, it is subjected to a blast of air from a fan placed in fan-case L. Inside of the fan-case is arranged a curved plate, N, there being a sufficient space between the plate and the top of the fan-case to allow a large volume of air to pass between them. The air passing between this plate and the fan-case is accelerated and discharged directly under the lower shaker, where the grain falls through, and thus blows the chaff away before it falls down on the riddles, usually arranged below.

Journaled in the front end of the machine is the double-cranked shaft P, and fastened to each of the cranks are the two connecting-rods R and S, the rod R being fastened to the under side of the carrier H, while the rod S is fastened to a rod, T, which projects across, under, and beyond the sides of the machine, and is connected by suitable rods with the long bars U, which bars are secured to the rocking shafts C, that operate the shakers E, whereby the shakers are simultaneously operated, the double-crank shaft and its connecting-rods R S causing the shakers to move forward while the carrier moves backward, and vice versa.

Having therefore fully described my invention, what I claim as new, and desire to secure by Letters Patent, is—

1. A straw-conveyer composed of successive sections, each section vibrating from a pivotal line located substantially above its front or receiving end, thereby serving the double capacity of straw-conveyer or shaker, substantially as specified.

2. The combination of a straw-conveyer composed of successive sections, each section vibrating from a pivotal line located substantially above its front or receiving end, and mechanism whereby the sections are simultaneously operated for conveying the straw from one section to another, substantially as specified.

3. The combination of a straw-conveyer composed of successive sections, each section vibrating from a pivotal line located substantially above its front or receiving end, a carrier suspended under said conveyer, and intermediate connecting mechanism whereby said straw-conveyer and carrier are simultaneously moved in opposite directions, substantially as specified.

4. The combination of the shakers E, suspended by the rocking shafts C at their front ends, and connected to the rod U, with the carrier H, connecting-rods R S, and double-crank shaft P, substantially as and for the purpose herein shown and described.

5. The combination, with the rear shaker, E, of the series, of the vibrating and pivoted shouldered prongs or fingers O, for discharging or ejecting the straw from the machine, substantially as herein shown and described.

6. The carrier H, provided with transverse inclined recesses or grooves and lattice-work, and having the pivoted shouldered prongs or fingers O in its rear end just beyond the lattice-work, so as to discharge or eject the straw, substantially as herein shown and described.

7. In a straw-carrier for thrashing-machines, the shakers and straw-conveyers E, constructed substantially as shown and described, arranged in successive sections, and suspended at their front ends by the rocking shafts C, and connected to the rods U, in combination with operating mechanism whereby they are adapted to receive simultaneous upward tilting and vibrating movements, substantially as specified.

FLORENS KITTEN.

Witnesses:
FRIEZ SICKMAN,
CHARLES H. ROBERTS.